United States Patent [19]

Brännström

[11] Patent Number: 5,016,435
[45] Date of Patent: May 21, 1991

[54] METHOD OF CONTROLLING A PFBC PLANT IN THE EVENT OF OPERATIONAL DISTURBANCE IN THE GAS TURBINE UNIT

[75] Inventor: Roine Brännström, Finspong, Sweden

[73] Assignee: ABB Stal AB, Sweden

[21] Appl. No.: 598,823

[22] Filed: Sep. 28, 1990

Related U.S. Application Data

[63] Continuation of Ser. No. 278,894, Dec. 2, 1988, abandoned.

[30] Foreign Application Priority Data

Dec. 2, 1987 [SE] Sweden .................................. 8704823

[51] Int. Cl.$^5$ ................................................ F02C 3/26
[52] U.S. Cl. ................................. 60/39.05; 60/39.464
[58] Field of Search ................ 60/39.05, 39.464, 39.25, 60/39.29, 31.1, 39.53, 39.55, 39.58, 39.5, 39.12; 122/4 D; 110/263, 347; 437/7, 170

[56] References Cited

U.S. PATENT DOCUMENTS

| | | | |
|---|---|---|---|
| 3,203,175 | 8/1965 | Michalicka et al. | 60/39.464 |
| 4,281,510 | 8/1981 | Börjesgard et al. | 60/39.464 |
| 4,306,411 | 12/1981 | Zoll | 60/39.464 |
| 4,315,400 | 2/1982 | Cole et al. | 60/39.464 |
| 4,380,147 | 4/1983 | Zaba | 60/39.464 |
| 4,498,285 | 2/1985 | Kreij | 60/39.464 |
| 4,498,286 | 2/1985 | Brannstrom | 60/39.464 |
| 4,744,212 | 5/1988 | Andersson et al. | 60/39.464 |

Primary Examiner—Louis J. Casaregola
Attorney, Agent, or Firm—Pollock, Vande Sande & Priddy

[57] ABSTRACT

In a PFBC power plant having a bed vessel containing a bed of fluidizable particulate material enclosed within a pressure vessel and surrounded by compressed combustion air, a gas turbine-compressor unit driven by combustion gases from the bed vessel, a first cut-off valve in a supply conduit for propellent gas to a turbine; a second cut-off valve in the conduit from a compressor to the bed vessel, a third cut-off valve in a by-pass conduit between the turbine and the compressor, and a blow-off valve in a conduit for dumping combustion gases from the bed vessel, a method of controlling such power plant in the event of an operational disturbance in the turbine unit comprises the steps of isolating the compressor-turbine unit from the bed vessel by closing the first cut-off valve in the supply conduit and the second cut-off valve in the conduit from the compressor to the bed vessel, short-circuiting the compressor-turbine unit by opening the valve in the bypass conduit, dumping the combustion gases by opening the blow-off valve, and injecting cooling water into the gases being dumped in the conduit for dumping gases between the bed vessel and the blow-off valve.

5 Claims, 2 Drawing Sheets

METHOD OF CONTROLLING A PFBC PLANT IN THE EVENT OF OPERATIONAL DISTURBANCE IN THE GAS TURBINE UNIT

This application is a continuation, of Ser. No. 07/278,894, filed on Dec. 2, 1988 (abandoned).

TECHNICAL FIELD

The present invention relates to a method of controlling a Pressurized Fluidized Bed Combustion (PFBC) plant in the event of an operational disturbance of the gas turbine unit. Several forms of operational disturbance may occur, for example excessive speed in the case of a load drop out, vibrations, pumping in a compressor, faults in an auxiliary system, or other stability problems resulting in a GT trip (gas turbine trip, i.e. shutdown of the gas turbine), that is, opening of a by-pass valve between the gas conduit to the turbine and the air conduit from the compressor and closing of valves in the gas and air conduits. The Purpose of the invention is to protect the gas turbine and the compressor by reducing as fast as possible the speed as well as the pressure and temperature levels to harmless values.

BACKGROUND OF THE INVENTION

If the gas turbine unit of the plant cannot rapidly resume normal operating conditions, for example by re-synchronizing of the generator of a power turbine, the very large energy contents of the PFBC plant in the hot bed, in the surrounding pressure vessel and in unburnt fuel in the bed entail special and difficult problems to be solved. When a rapid reconnection of the generator of a power turbine to its power network in not possible, the energy contents in the bed and in the unburnt fuel have to be removed. When shutting off the turbine, the gas flow through the bed vessel and the turbine is reduced to such a level as is determined by an unavoidable leakage flow in the valve in the hot gas conduit between the bed vessel and the turbine. The air supply to the bed becomes insufficient for fluidization of the bed and for complete combustion of fuel present in the bed. This means that the bed collapses with the ensuing risk of the bed material sintering together and the formation of carbon monoxide (CO), which entails a risk of explosion and also means that the leakage flow contains energy-rich combustible gas. Combustion of this gas downstream of the cut-off valve may cause an impermissibly high gas temperature for the gas turbine and the energy contents may give an impermissibly high speed of turbines in the plant.

It has been proposed to blow off the hot combustion gases from the bed vessel of the plant to the atmosphere. The gases have a temperature of 800°–900° C. and are mixed with about 200 ppm dust. It is dufficult—not to say impossible—to cause a valve operating at such a high temperature and in such a severe environment to seal. In addition, it is very difficult to satisfactorily clean the very large flow of gas at such a high temperature. A suitable valve would be expensive and its working life would be short. One way of reducing the inconvenience of leakage in a valve for blowing off combustion gases from the bed vessel is to blow off, at the same time, the compressed combustion air in a pressure vessel surrounding the bed vessel in the manner disclosed in U.S. Pat. No. 4,498,285 to Kreij. The combustion gases are then mixed with air and cooled so that a valve in the pressure vessel wall is not subjected to gases of such extremely high temperatures. A disadvantage is that compressed combustion air is to a large extent consumed for cooling of the combustion gases which leave the bed vessel and do not pass through the bed. This may mean that the fuel in the bed is not completely burnt and that the bed material will not be cooled to the desired extent. The combustible gases may entail a risk of explosion. A high bed temperature after a blow-off may result in the bed material sintering. In a valve in the bed vessel wall, a certain leakage into the bed vessel may be tolerated. However, the method is not completely satisfactory.

U.S. Pat. No. 4,744,212 to Andersson et al discloses a method of overcoming the problems by supplying an inert gas, suitably nitrogen, to the bed vessel when the turbine is being shut off. This interrupts the supply of oxygen to the bed and hence the combustion, thus preventing the formation of carbon monoxide and eliminating the risk of explosion.

SUMMARY OF THE INVENTION

In the case of an operational disturbance resulting in a load drop out, the gas turbine of the plant or the gas turbine and the combustion air compressor is/are isolated in a known manner from the bed vessel or the pressure vessel, surrounding the bed vessel, by shutting off the valve in the hot gas conduit between the bed vessel and the turbine or the turbines and in the air conduit between the compressor and the pressure vessel. At the same time a by-pass valve is opened in a short-circuit conduit between the air conduit and the hot gas conduit, so that air from the compressor is passed directly to the turbine. A certain residual flow through the valve in the hot gas conduit is obtained due to the fact that a complete seal cannot be achieved in a valve which is subjected to hot gas at a temperature of 800°–950° C. To shut down the power plant in the case of an operational disturbance, the remaining fuel in the bed must be burnt and the bed be cooled. Gas from the bed vessel is dumped to the atmosphere via a conduit extending directly form the bed vessel, or via a conduit extending from the hot gas conduit to the turbine and provided with a blow-off valve. The last-mentioned conduit is provided with an injection device for a coolant through which, when the combustion gases are dumped, coolant is injected in such an amount that the gases are efficiently cooled before they reach the blow-off valve. Suitably, coolant is injected in such an amount that the gases are cooled to a temperature of 400° C. When the gases are cooled to below 400° C., valves with satisfactory sealing, function and working life can be obtained at reasonable costs. Water is a suitable coolant, but also other liquids, for example liquid nitrogen, may be used.

Cooling water for injection into the blow-off or dump conduit is suitably stored in a container pressurized by gas. The container communicates with the injection device via a conduit with a valve which is operated by means of an operating device connected to the control equipment of the power plant.

BRIEF DESCRIPTION OF THE DRAWING

The invention will be described in greater detail with reference to the accompanying schematic drawing, wherein.

DESCRIPTION OF THE PREFERRED EMBODIMENT

Figure 1:
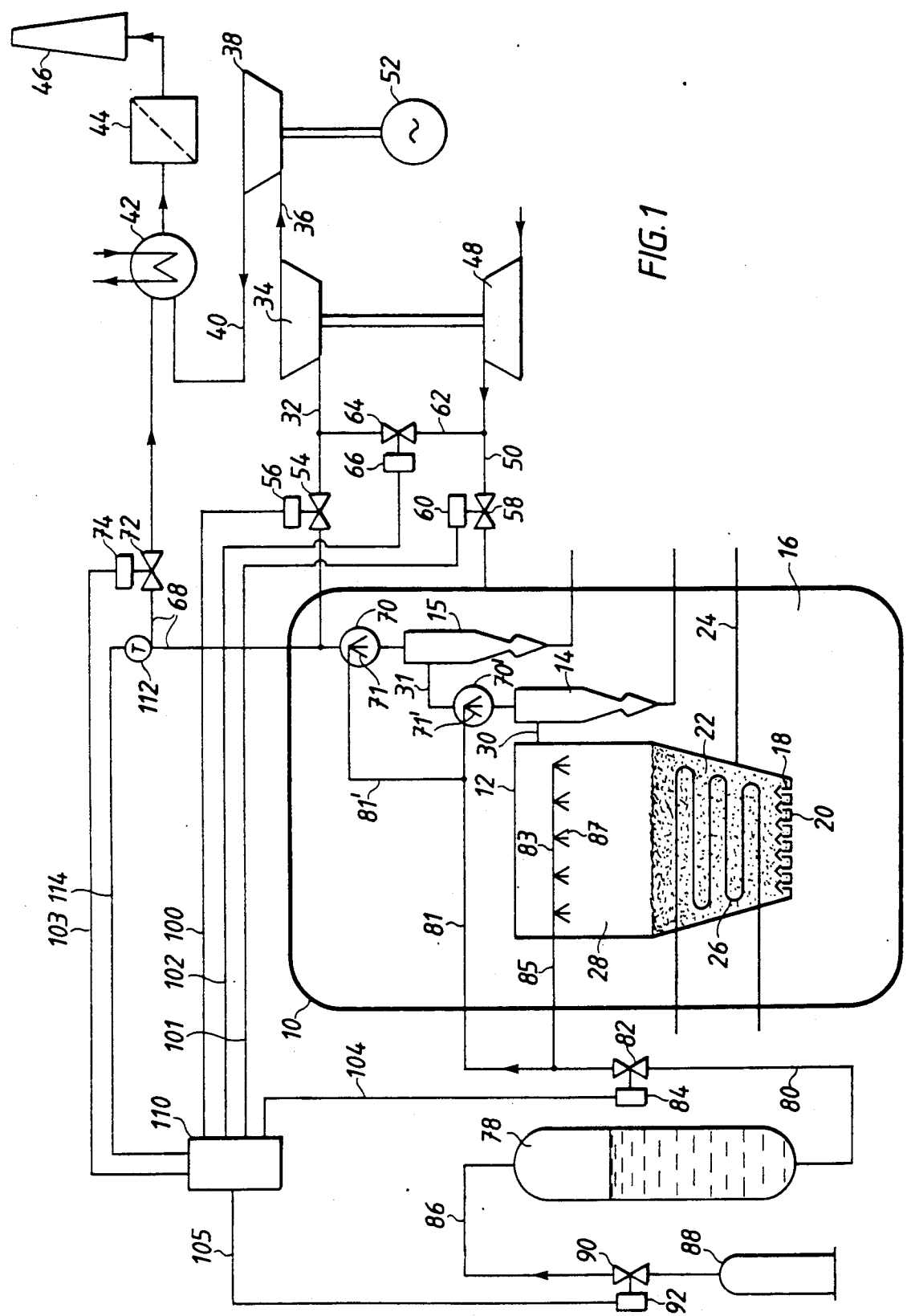
FIG. 1 shows a plant provided with water injection devices in the freeboard of the bed vessel and in gas conduits arranged downstream of cyclones.

In the figures, 10 designates a pressure vessel. The pressure vessel accommodates a bed vessel 12 and a cleaning plant, symbolized by two series-connected cyclones 14 and 15. In reality, the cleaning plant comprises a number of parallel-connected groups of series-connected cyclones. The space 16 between the pressure vessel 10 and the bed vessel 12 contains compressed combustion air. The pressure may amount to 2 MPa or more. Combustion air is supplied to the bed vessel 12 via nozzles 18 at the bottom 20. This air fluidizes the bed 22 in the lower part of the bed vessel 12 and burns a fuel, usually coal, which is supplied to the bed 22 from a fuel storage (not shown) via the conduit 24. The bed 22 contains tubes 26 which generate steam to a steam turbine (not shown) driving a generator. The combustion gases are collected in the freeboard 28 and are conducted in the conduits 30 and 31 to the cyclones 14 and 15. A plurality of parallel-connected groups of cyclones 14, 15 are present. From the cyclone 15 the hot gases are conducted via the conduit 32 to a high pressure turbine 34, from there via a conduit 36 to a low pressure turbine 38 and from there further via the conduit 40 to the economizer 42, the filter 44 and further, through the chimney 46, into the atmosphere.

The high pressure turbine 34 drives the compressor 48. The space 16 is supplied with compressed combustion air through conduit 50. The low-pressure turbine 38 drives a generator 52. The hot gas conduit 32 includes a cut-off valve 54 with an operating device 56. The conduit 50 from the compressor 48 is provided with a cut-off valve 58 with an operating device 60. Between the conduits 32 and 50 there is a short-circuit conduit 62 with a by-pass valve 64 operated by an operating device 66.

In the embodiment according to FIG. 1, a conduit 68 for dumping combustion gases extends from the bed vessel 12, the hot gas conduit 32 between cyclone 15 and turbine 34 and opens out into the economizer 42. The conduit 68 is provided with at least one dump valve 72 with an operating device 74. For security reasons two valves are usually connected in series. The dump conduit 68 includes a device 70 with nozzles 71 for injection of cooling water. In addition there are a water injection device 70' with nozzles 71' in the conduit 31 between the cyclones 14 and 15 and a water injection device 83 with nozzles 87 in the freeboard 28 of the bed vessel 12. Injection of cooling water into the freeboard 28 of the bed vessel 12 entails a long dwell time of injected water in the hot gases for evaporation and good mixing in cyclones. The injection of cooling water in the injection device 70 can thereby be limited. A plant can be constructed with one or more of the water injection devices 70, 71' and 83 shown.

The water injection devices 70, 70' and 83 are connected to a pressurized cooling water tank 78 via the conduit 80, the valve 82 with the operating device 84 and the conduits 81, 81' and 85. The water tank 78 communicates with a pressure gas source 88 via the conduit 86. Nitrogen gas is suitably used. The conduit 86 comprises a valve 90 with an operating device 92. The operating devices 56, 60, 66, 74, 84, 92 of the valves 54, 58, 64, 72, 82, 90 are connected by conduits 100–105 to an operating unit 110, which forms part of the central control equipment for the plant. A temperature sensor 112 in the dump conduit 68 is connected to the operating unit 110 via the conduit 114.

Figure 2:
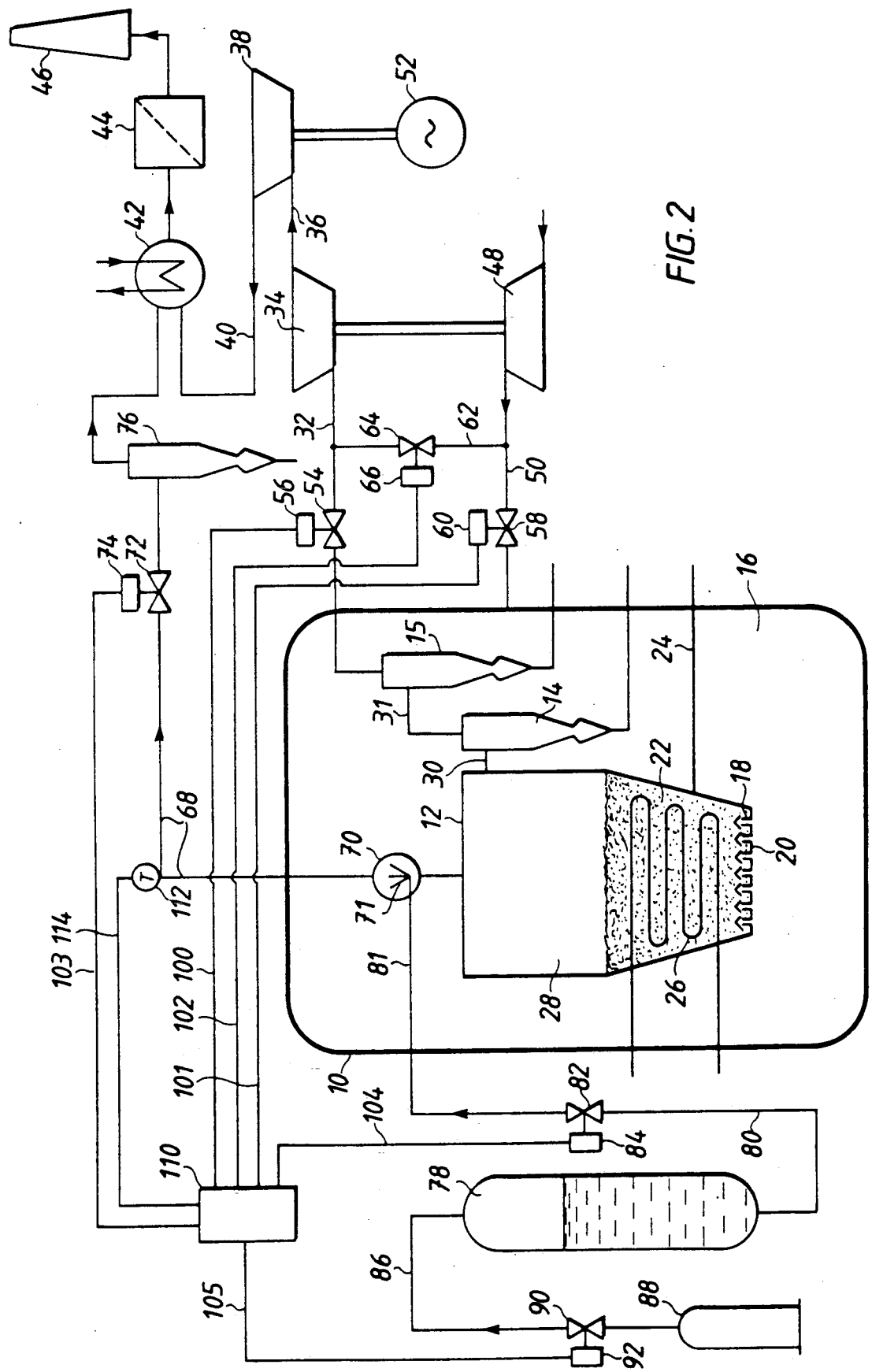
FIG. 2 shows a plant with a water injection device in a blow-off conduit extending directly from the bed vessel.

In the embodiment according to FIG. 2, the dump conduit 68 is connected directly to the freeboard 28 of the bed vessel 12. Between the dump valve 72 and the economizer 42 there is a gas cleaner 76 for separation of dust.

In the case of an operational disturbance, for example a gas turbine trip following a load drop out, the fuel supply to the bed 22 is stopped and the valves 54 and 58 in the hot gas conduit 32 and in the air conduit 50, respectively, are shut off so that the turbines 34 and 38 and the compressor 48 are isolated from the bed vessel 12 and from the pressure vessel 10, respectively. At the same time, the by-pass valve 64 in the short-circuit conduit 62 is opened so that the air from the compressor 48 flows directly into the turbine 34. By interrupting the energy supply from the bed vessel 12, the power turbine 38 is prevented from racing. Thereafter, the valve 72 is opened and the combustion gases from the bed vessel 12 are dumped. The valve 82 is at the same time opened and cooling water is injected into the hot gas stream through nozzles 71, 71', 87 in the water injection device 70, 70', 83 in the embodiment shown in FIG. 1. The water is evaporated and lowers the temperature of the gases before these reach the blow-off valve 72. Dust is separated in the cyclones 14, 15 or in the cleaner 76. The gases are cooled in the economizer 42 to a temperature tolerable for the filter 44, whereupon the gases are led to the chimney 46.

If the same amount of water is injected per unit of time during the whole pressure reduction process, the gas temperature drops as the gas flow successively decreases. For this reason, the flow of cooling water should be controlled. The water injection is suitably controlled by the valve 82 so that the temperature of the gases when they enter the economizer 42 is equal to or somewhat lower than the temperature of the waste gases from the turbine during normal operation, i.e. about 400° C. This results in the lowest temperature stress on the economizer 42 when blowing off the combustion gases from the bed vessel 12.

The capacity in the dump conduit 68 is chosen such that a sufficient fluidization of the bed 22 is obtained. During the first part of the dumping operation, fuel remaining in the bed 22 is burnt. When the fuel has been consumed, the air flowing through the bed 22 cools the bed material. Also the tubes 26, through which water and steam flow, contribute at the same time to the cooling of the bed material. When the compressed combustion air in the space 16 has been consumed, the bed material has been cooled to such an extent that the risk of sintering together is eliminated.

It is readily appreciated that the embodiment of FIGS. 1 and 2 can also be combined in many ways.

I claim:

1. A method of controlling a PFBC plant in the event of operational disturbance in the turbine unit, the PFBC power plant having a bed vessel enclosed within a pressure vessel and surrounded by compressed combustion air, the bed vessel containing a bed of fluidizable particulate material; a gas turbine-compressor unit driven by combustion gases from the bed vessel; a first cut-off valve in a supply conduit for propellent gas to a turbine; a second cut-off valve in the conduit from a compressor to the bed vessel; a third cut-off valve in a by-pass conduit between the turbine and the compressor; and a blow-off valve in a conduit for dumping combustion gases from the bed vessel, said method comprising the steps of:

- isolating the gas compressor-turbine unit from the bed vessel by closing the first cut-off valve in the supply conduit and the second cut-off valve in the conduit from the compressor to the bed vessel;
- short-circuiting the compressor-turbine unit by opening the valve in the bypass conduit;
- dumping the combustion gases by opening said blow-off valve; and
- injecting cooling water into the combustion gases being dumped in the conduit for dumping the combustion gases at a location between the bed vessel and said blow-off valve such that said combustion gases are cooled before reaching said blow-off valve.

2. A method according to claim 1, wherein the cooling water is supplied to the gases being dumped in such a quantity that the gases are cooled to a temperature below 400° C.

3. A method according to claim 1, wherein the cooling water flow is controlled such that the gases downstream of the cooling water injection point attain a constant temperature during the blow-off process.

4. A method according to claim 1, wherein the cooling water flow is controlled such that the gases downstream of the cooling water injection point attain a temperature below about 400° C. but exceeding the acid dew point of about 120°–180° C.

5. A method according to claim 1, wherein the cooling water is supplied from a permanently pressurized coolant container.

* * * * *